(12) United States Patent
Jain et al.

(10) Patent No.: US 9,984,367 B2
(45) Date of Patent: May 29, 2018

(54) PAYING NON-SETTLEMENT TRANSACTIONS

(75) Inventors: Rohit Jain, Woodinville, WA (US); Mary Katherine Bowman, Seattle, WA (US); Richard D. Hunt, Seattle, WA (US); Kurt Harold Zumwalt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 297 days.

(21) Appl. No.: 13/168,834

(22) Filed: Jun. 24, 2011

(65) Prior Publication Data
US 2012/0330718 A1    Dec. 27, 2012

(51) Int. Cl.
G06Q 20/34    (2012.01)
G06Q 30/06    (2012.01)
G06Q 40/02    (2012.01)
G06Q 20/38    (2012.01)

(52) U.S. Cl.
CPC ........... *G06Q 20/34* (2013.01); *G06Q 20/381* (2013.01); *G06Q 30/06* (2013.01); *G06Q 40/02* (2013.01)

(58) Field of Classification Search
CPC .............................. G06Q 20/38; G06Q 20/381
USPC ......................................................... 705/39
See application file for complete search history.

(56) References Cited

U.S. PATENT DOCUMENTS

| | | | |
|---|---|---|---|
| 5,897,621 A * | 4/1999 | Boesch et al. ............ 705/26.82 |
| 6,892,184 B1 | 5/2005 | Komem et al. |
| 7,747,475 B1 * | 6/2010 | Bowman et al. ............ 705/26.1 |
| 2001/0056398 A1 * | 12/2001 | Scheirer ....................... 705/38 |
| 2002/0087455 A1 | 7/2002 | Tsagarakis et al. |
| 2002/0174031 A1 | 11/2002 | Weiss |
| 2003/0208422 A1 * | 11/2003 | Burczyk ....................... 705/35 |
| 2004/0148255 A1 * | 7/2004 | Beck et al. ................... 705/39 |
| 2005/0021454 A1 * | 1/2005 | Karpovich ............ G06Q 20/00 705/39 |
| 2008/0147569 A1 * | 6/2008 | Kahan ............... G06Q 30/0283 705/36 R |

(Continued)

FOREIGN PATENT DOCUMENTS

| CN | 1304511 | 7/2001 |
|---|---|---|
| CN | 1835015 | 9/2006 |

(Continued)

OTHER PUBLICATIONS

PCT Search Report dated Sep. 24, 2012 for PCT application No. PCT/US2012/043590, 7 pages.

(Continued)

*Primary Examiner* — Namrata Boveja
*Assistant Examiner* — Liz P Nguyen
(74) *Attorney, Agent, or Firm* — Lee & Hayes, PLLC (57) ABSTRACT

Payment of non-settlement currencies includes developing a non-settlement currency exchange separate from a financial institution unwilling to assume risks in converting non-settlement currencies. The non-settlement currency exchange includes a predictive model to provide an estimated currency exchange rate. Schemes are provided where a merchant may share currency exchange profit and/or currency exchange losses with a financial institution. The exchange rate may be persisted in subsequent related financial transactions such as a refund, a chargeback, and/or a representment.

23 Claims, 5 Drawing Sheets

(56) References Cited

U.S. PATENT DOCUMENTS

| | | | |
|---|---|---|---|
| 2009/0076876 A1* | 3/2009 | Knowles | G06F 9/4843 718/102 |
| 2010/0057607 A1 | 3/2010 | Galit | |
| 2010/0145744 A1 | 6/2010 | Beck et al. | |
| 2011/0282780 A1* | 11/2011 | French et al. | 705/39 |

FOREIGN PATENT DOCUMENTS

| | | |
|---|---|---|
| CN | 101192320 | 6/2008 |
| JP | H1063634 | 3/1998 |
| JP | 2000149084 | 5/2000 |
| JP | 2002150188 | 5/2002 |
| JP | 2002197552 | 7/2002 |
| JP | 2002251522 | 9/2002 |
| JP | 2006513512 | 4/2006 |
| JP | 2007219569 | 8/2007 |
| JP | 2009009502 | 1/2009 |
| JP | 2010277465 | 12/2010 |
| WO | WO2010022344 | 2/2010 |

OTHER PUBLICATIONS

Singapore Office Action dated Nov. 27, 2014 for Singapore Patent Application No. 201309400-8, a counterpart foreign application of U.S. Appl. No. 13/168,834, 7 pages.

Extended European Search Report dated Feb. 2, 2015 for European patent application No. 12802814.9, 7 pages.

Translated Japanese Office Action dated Feb. 10, 2015 for Japanese patent application No. 2014-517177, a counterpart foreign application of U.S. Appl. No. 13/168,834, 8 pages.

"Payment in Customers Local Currency", Monthly Computer Digest, TAC Corporation, vol. 25, No. 5, May 10, 1999, p. 92.

Canadian Office Action dated May 11, 2015 for Canadian patent application No. 2,839,153, a counterpart foreign application of U.S. Appl. No. 13/168,834, 5 pages.

Singapore Office Action dated May 19, 2015 for Singapore patent application No. 201309400-8, a counterpart foreign application of U.S. Appl. No. 13/168,834, 8 pages.

Chinese Office Action dated Mar. 21, 2016 for Chinese patent application No. 201280031288.8, a counterpart foreign application of U.S. Appl. No. 13/168,834.

European Summons to Attend Oral Proceedings dated Apr. 5, 2016 for European Patent Application No. 12802814.9, a counterpart foreign application of U.S. Appl. No. 13/168,834, 6 pages.

European Office Action dated Oct. 29, 2015 for European patent application No. 12802814.9, a counterpart foreign application of U.S. Appl. No. 13/168,834, 7 pages.

Translated Japanese Office Action dated Oct. 27, 2015 for Japanese patent application No. 2014-517177, a counterpart foreign application of U.S. Appl. No. 13/168,834, 4 pages.

Translated Chinese Office Action dated Oct. 31, 2016 for Chinese Patent Application No. 201280031288.8, a counterpart foreign application of U.S. Appl. No. 13/168,834, 24 pages.

Canadian Office Action dated Sep. 28, 2016 for Canadian patent application No. 2839153, a counterpart foreign application of U.S. Appl. No. 13/168,834, 5 pages.

Translated Chinese Office Action dated Mar. 28, 2017 for Chinese Patent Application No. 201280031288.8, a counterpart foreign application of U.S. Appl. No. 13/168,834, 31 pages.

* cited by examiner

PAYING NON-SETTLEMENT TRANSACTIONS

BACKGROUND

Traditionally, a merchant who wished to sell products built a "bricks and mortar" store at a particular location. In the store, the merchant would receive payments directly from customers. Since most customers would be residents of the same country as the merchant, those customers would typically pay the merchant with the local currency. In cases where a customer would use a foreign currency, merchants would establish relationships with local banks and payment infrastructure to obtain currency conversion rates and exchange currency as needed. For example, if a Mexican merchant had a U.S. customer who wished to use U.S. dollars, the merchant would know a bank's exchange rate for Mexican pesos to U.S. dollars, could offer a price to the customer, accept payment in U.S. dollars and thereafter go to his local bank to exchange the payment to Mexican pesos.

In the above example, the merchant assumed a currency risk. Since currency exchange rates change daily, the merchant risked losing money if the next day's exchange rate yielded less Mexican pesos than before. On the other hand, if the exchange rate increased, the merchant would benefit by receiving more Mexican pesos than under the previous exchange rate. The more volatile the exchange rate, and the larger the spread of exchange rates over time, the more the merchant assumed currency risk.

In the case that a customer came back to the merchant for a refund, the merchant might refund in the local currency. However, if the customer demanded a refund in the original foreign currency, then the merchant might have to hold reserves of the foreign currency, or return to the bank to exchange local currency into the foreign currency. Either way, the merchant would be exposed to currency risk over several days.

Formerly, merchants might reduce exposure to currency risk by having a relatively low number of foreign currency transactions. For many merchants, taking on currency risk was an acceptable tradeoff for increasing their customer base. For traditional "bricks and mortar" stores, refunds were relatively rare, since foreign customers would return home, and no longer be near enough to the store to demand returns.

Presently, electronic payments systems, such as credit card infrastructure, have provided some services to support currency conversion. However, the currencies supported are limited to a set of relatively non-volatile currencies. Accordingly, potential customers resident in countries with volatile currencies may be excluded from transactions supporting currency conversion. The class of currencies excluded from these payment services, due to volatility, lack of treaty support for cross border exchange, or for other reasons are generally known as non-settlement currencies.

Regardless if a currency is a non-settlement currency or otherwise, present electronic payment systems do not maintain long term guarantees of exchange rates, such as guaranteeing a same return value in foreign currency for a returned item one week after a purchase. Thus the currency risk may be passed to the customer, thereby degrading the customer's experience when the customer receives less value for the returned item due to currency fluctuations.

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

DETAILED DESCRIPTION

Overview

A non-settlement currency payment platform may extend a merchant's market to customers who use non-settlement currency. Specifically, a non-settlement currency is a currency that is generally excluded from international payment services due to volatility, lack of treaty support for cross border exchange, or for other reasons. While a financial institution may not support a non-settlement currency, the non-settlement currency payment platform allows a merchant to assume at least a portion of a currency risk instead of relying on the financial institution. Thus a merchant can choose how to balance currency risk with the potential increase in market and profits by supporting transactions in a non-settlement currency.

The non-settlement currency platform may be integrated in a number of contexts. The non-settlement currency platform may be integrated into a particular electronic marketplace. Alternatively, the non-settlement currency platform may be integrated into a family of electronic marketplaces where the merchants collectively share risk. Furthermore, the non-settlement currency platform may be a third party service delegated to by other electronic marketplaces. Thus the non-settlement currency platform may be broadly deployed in a context that enables international transactions between merchants and customers that are located in different countries. Combined with the non-settlement currency platform's currency exchange capabilities, the electronic marketplaces may support borderless shopping.

The techniques and systems described herein may be implemented in a number of ways. Example implementations are provided below with reference to the following figures.

Illustrative Context for Non-Settlement Currency Payment Processing

Figure 1:
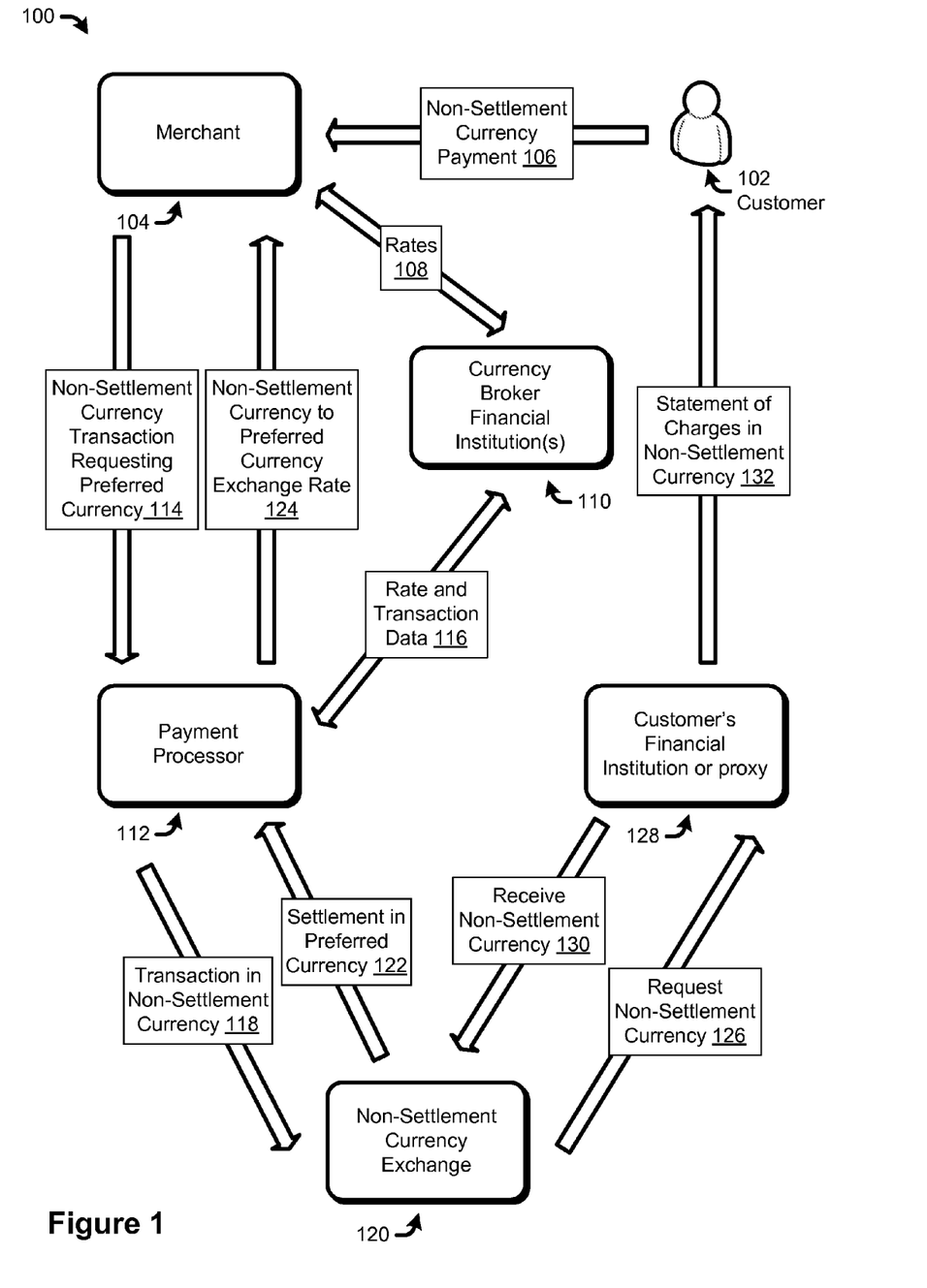
FIG. 1 is a top-level diagram illustrating an example context for settling financial transactions in a non-settlement currency.

FIG. 1 is a top-level diagram of an illustrative context for non-settlement currency payment processing 100. Specifically, FIG. 1 illustrates how a customer 102 may execute a financial transaction with an electronic marketplace merchant 104.

Typically, a merchant will have transactions priced in a native or preferred currency. For example, the merchant 104 could be based in Europe and have prices denominated in Euros. If customer 102 has a native currency of Mexican pesos, and if the merchant 104 does not have access to a financial institution willing to exchange Mexican pesos, then the Mexican pesos for the purposes of this example will be a non-settlement currency, and the merchant, or an operator of the non-settlement currency payment platform will have to assume currency risk in order to settle a customer's non-settlement currency payment 106.

The merchant 104 may display prices either in a preferred currency, in the non-settlement currency, and/or in other currencies. The merchant 104 may convert the preferred currency into other currencies, such as the non-settlement currency, using an estimated conversion rate based at least in part on rates 108 provided by a currency broker financial institution 110. The estimated conversion rate may be based on markups and other costs described below.

Upon receiving a non-settlement currency payment 106, the merchant 104 may forward the payment to a payment processor 112 as a corresponding non-settlement currency transaction 114 with a request to settle the transaction and receive payment in the preferred currency. The payment processor 112 may request and receive a currency exchange rate 116 for the transaction from currency broker financial institution 110, which may be a different currency broker financial institution than the currency broker financial institution used by the merchant. The payment processor may process credit cards, debit cards, and/or other types of electronic payment types as well as traditional payment types.

Had the transaction been in a settlement currency, the currency broker financial institution might have settled the transaction. However, since the currency in this example is a non-settlement currency, the payment processor 112 may forward a non-settlement currency transaction 118 to a non-settlement exchange 120. The non-settlement currency exchange 120 may settle the transaction by sending preferred currency 122 to the payment processor 112. The payment processor 112 then pays the merchant 104 in an exchange of preferred currency 124. In this way, despite receiving a non-settlement currency payment 106, the merchant 104 receives a credited payment in the preferred currency 124.

At this point, the non-settlement currency exchange 120 still needs to resolve the non-settlement currency payment with the customer 102. Specifically, the customer will receive a debit corresponding to the merchant's credited payment in terms of the non-settlement currency. This occurs by requesting non-settlement currency 126 from the customer's financial institution or proxy 128. Since the customer's financial institution or proxy 128 is typically, but not necessarily, in the same locale as the customer, the customer's financial institution or proxy 128 supports the non-settlement currency, and provides non-settlement currency 130 to the non-settlement currency exchange 120.

After the customer's account has been debited at the customer's financial institution or proxy 128, the customer 102 will receive a statement of charges 132. Since the customer's financial institution or proxy 128 is denominated in the non-settlement currency, the customer 102 will receive the statement of charges 132 in terms of the non-settlement currency. Thus from the customer's perspective, both the payment 106 and the statement of charges 132 are in terms of the non-settlement currency. The underlying transaction settlement in a preferred currency is therefore not visible to the customer 102.

Note that this abstraction is made possible by the non-settlement currency exchange 120. The non-settlement currency exchange 120 provides a mechanism to in effect settle non-settlement currencies to a party willing to assume the currency risk. The non-settlement currency exchange 120 is described in further detail with respect to FIG. 3 below.

Exemplary Hardware Environment

Figure 2:
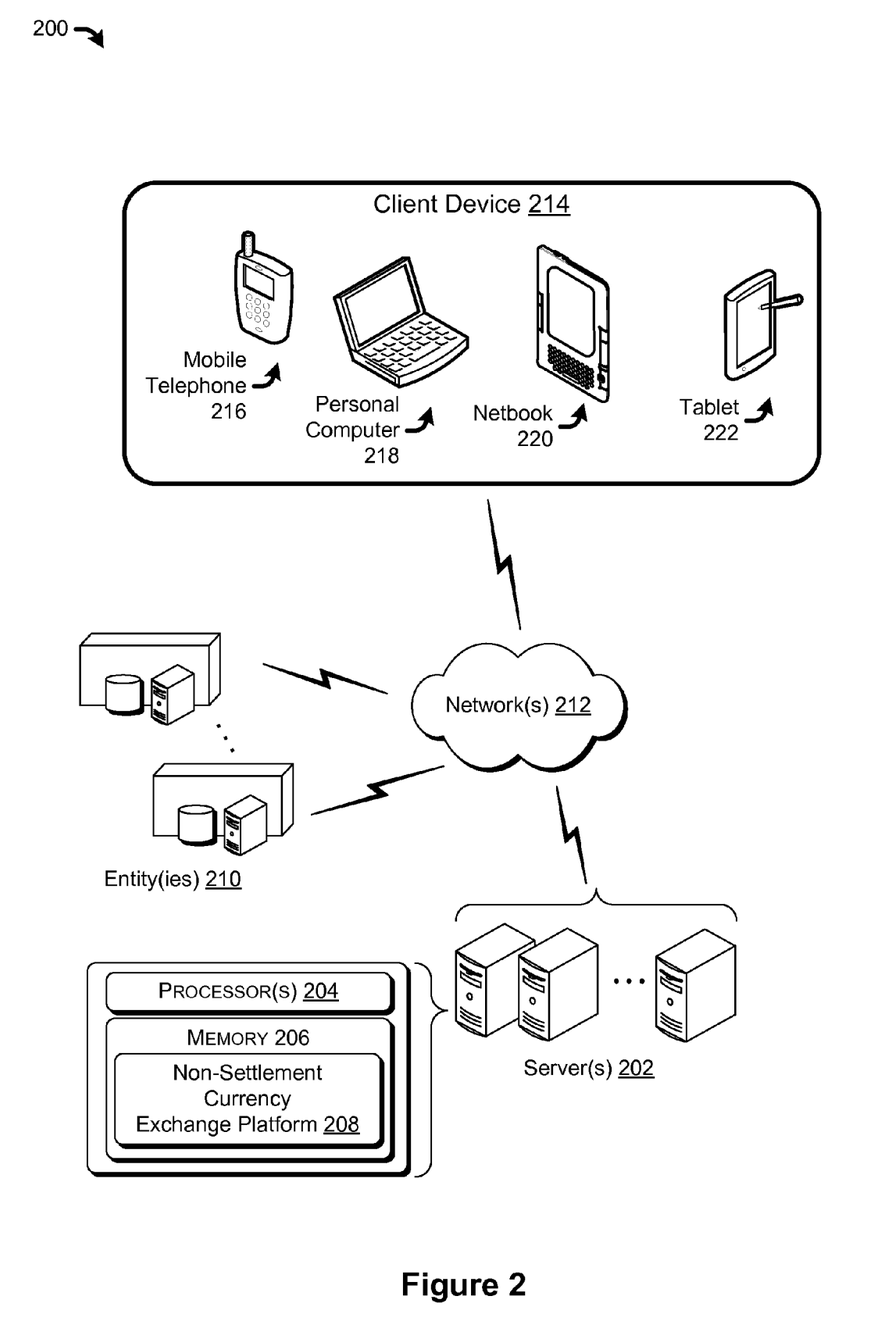
FIG. 2 is an example hardware environment for settling financial transactions in a non-settlement currency.

Prior to describing the non-settlement currency exchange 120, FIG. 2 illustrates an exemplary hardware environment 200 for a non-settlement currency payment platform.

The environment 200 includes servers 202 that may host a non-settlement currency payment platform. The servers 202 may include one or more processors 204 and memory 206. The memory 206 may store various programs, modules, and components to perform the non-settlement currency exchange, in whole or in part. In some embodiments, the memory 206 may store the non-settlement currency exchange platform 208. Although the non-settlement currency exchange platform 208 is shown in FIG. 2 as associated with the servers 202, some of the non-settlement currency exchange platform 208 may be distributed across other servers, which may be operated by other entities 210. In some embodiments, some of or the entire non-settlement currency exchange platform 208 may reside in a cloud computing environment, which is accessible via a network 212.

A client device 202 may access the non-settlement currency exchange platform 208 via one or more networks 212. For example, the networks 212 may be local area networks (LAN), wide area networks (WAN), mobile telephone networks, and/or other networks, which may provide wired or wireless connectivity and may be implemented with other types of networks.

The client device 214 may be any networked client, including but not limited to a mobile telephone 216, a personal computer 218, a netbook 220, a tablet 222, or other networked devices (e.g., television, vending machine, etc.). In an example operation, the customer 102 may access an electronic marketplace via the client device 214. While interacting with the electronic marketplace, the customer 102 may desire to make a payment with a non-settlement currency, which may involve direct or indirect interaction with the servers 202 to access the non-settlement currency exchange platform 208.

Exemplary Embodiment of a Non-Settlement Currency Exchange

Figure 3:
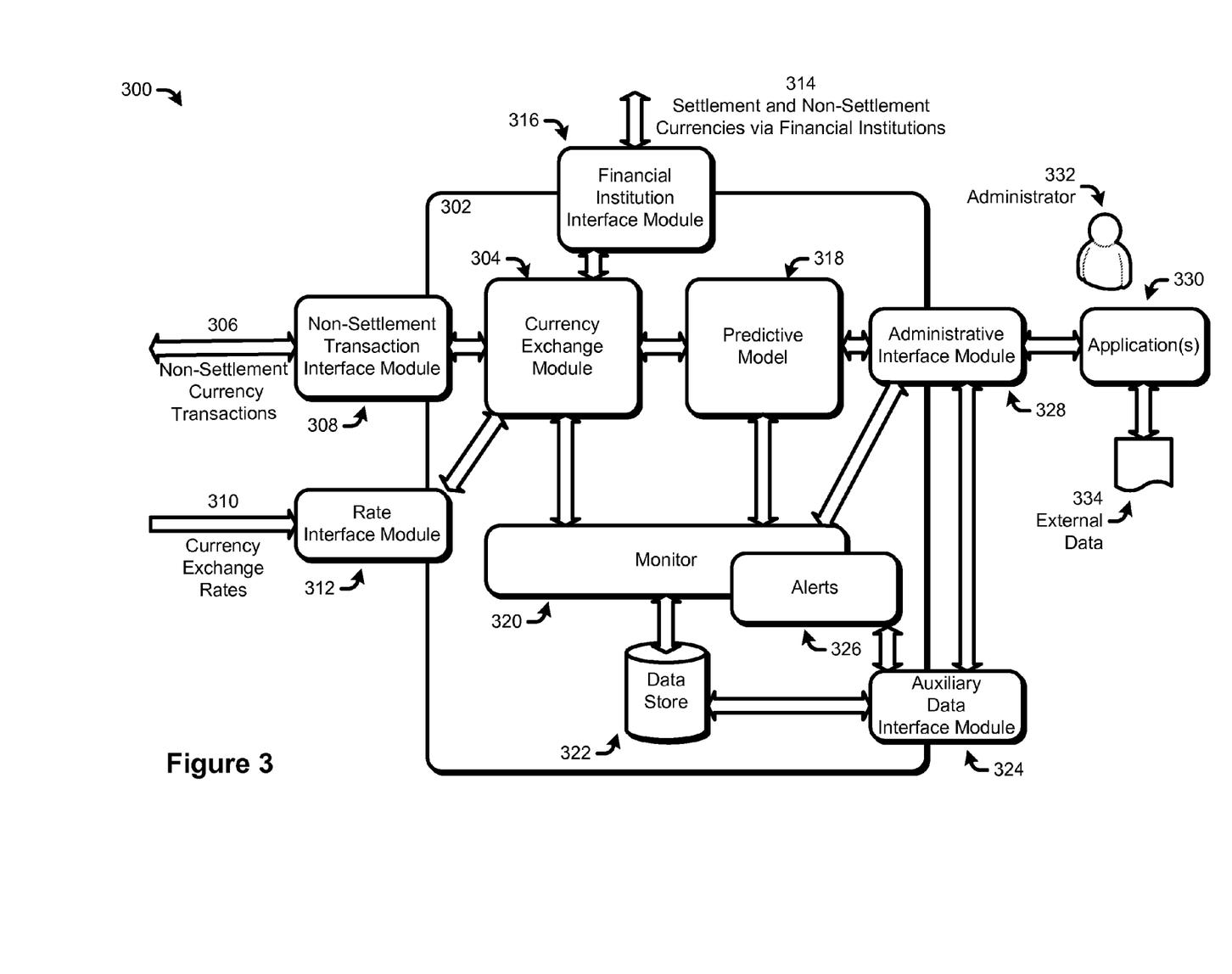
FIG. 3 is a block diagram of an example architecture for settling financial transactions in a non-settlement currency, and monitoring those transactions.

FIG. 3 is a block diagram illustrating an example architecture 300 for settling a financial transaction in a non-settlement currency exchange. Specifically, FIG. 3 illustrates a non-settlement currency exchange 302 (shown in FIG. 1 as 120).

At the heart of non-settlement currency exchange 302 is a currency exchange module 304, which estimates a currency exchange rate based on various inputs. The inputs may include non-settlement currency transactions 306 via a non-settlement transaction interface module 308, currency exchange rates 310 via a rate interface module 312 and settlement or non-settlement currency 314 from financial institutions via financial institution interface 316. In some embodiments, rate information may be embedded in the non-settlement currency transaction 306 information. Thus while FIG. 3 illustrates the non-settlement transaction interface module 308 and the rate interface module 312 as separate modules, other embodiments may combine the two interface modules into one module.

The currency exchange module 304 also makes use of a predictive model 318 in determining currency exchange rates. The predictive model 318 may enable profitable operation of non-settlement currency transactions. Among other reasons, currencies are non-settlement currencies because many financial institutions do not find risk manageable or settlement operations profitable. Developing a predictive model to accurately determine an exchange rate estimate and developing schemes to offset risk in the event the exchange rate estimate is incorrect or results in a loss is discussed in following section titled "Predictive Models."

It is generally desirable to monitor financial transactions in order to support audit functions. In the non-settlement currency exchange 302, monitoring is also desirable in order to evaluate the performance of the predictive model 318. A monitor 320 fulfills this function by receiving transactional data from the currency exchange model 304, including the currency exchange rate estimated by the currency exchange model 304. The monitor 320 also accesses the predictive model 318 in order to determine the inputs used to create the currency exchange rate used for a particular transaction. Corresponding records may then be created and stored in a data store 322. Data store 322 may then be accessed via an auxiliary data interface module 324 which facilitates programmatic access.

The monitor 320 may be configured to trigger alerts 326 for predetermined conditions. For example, if an estimated exchange rate results in an inordinate number of losses as determined by a predetermined threshold, an alert may be set to stop offering such transactions or to adjust the exchange rate to compensate for the losses, possibly via a notification to an administrator. By way of another example, if an estimated exchange rate is resulting in highly profitable transactions, but lowers the number of customers participating below a predetermined threshold, an alert may be set to adjust the exchange rate and/or notify an administrator. The alerts 326 may be implemented via the auxiliary data interface module 324, which may provide instructions to enable automation of the alerts via the programmatic access.

Administrative interface module 328 provides general programmatic access to the non-settlement currency exchange 302 providing access to the monitor 320, the alerts 326 and data via the auxiliary data interface module 324. Although FIG. 3 shows the administrative interface module 328 and the auxiliary data interface module 324 as separate entities, other embodiments may opt to combine the two modules.

Various administrative applications 330 may be developed to provide a toolset for administrators 332. These administrative applications 330 access the non-settlement currency exchange 302 via administrative interface module 328. In this way administrators may view, audit and evaluate monitored transactions 320, run queries and obtain data sets against data store 322, set and respond to alerts 326, modify the predictive model 318, and other administrative tasks.

Programmatic access to the non-settlement currency exchange 302 via administrative interface module 328 provides the additional advantage of dynamic modification in real-time, that is to say the predictive model 318 may be changed in between transactions without requiring the non-settlement currency exchange 302 to be made unavailable. In one simple example, the spread between a preferred currency and a non-settlement currency could be quickly modified. By way of a more complex example, automated responses to alerts or otherwise disadvantageous situations may be deployed. For example, a query against the data store 322 may pull all transaction records at an unprofitable exchange rate. This set of records would comprise a data set. The data set may be programmatically analyzed, and if the degree of unprofitability met a particular threshold, the currency exchange module 304 could be dynamically configured to stop offering exchanges for that particular currency at that particular rate or to further modify the exchange rate to make the transactions profitable.

Programmatic access to the non-settlement currency exchange 302 via administrative interface module 328 also allows evaluation of the predictive model 318 using data external 334 to the non-settlement currency converter 302. External data may include volatility of a non-settlement currency; volatility of a preferred currency; a spread between a preferred currency and a non-settlement currency; a cost to process an exchange between a preferred currency and a non-settlement currency; and an adoption rate of new customers traceable to enabling processing of a non-settlement currency are some examples of outside data. Accordingly, the predictive model 318 may be made increasingly accurate.

Predictive Models

The predictive model 318 is used to predict the market exchange rate of the preferred currency to the payment currency at the time of settlement. The predictive model 318 is predictive since the time of settlement is often several days after the time of the financial transaction. If the predictive model 318 estimates an exchange rate that is inaccurate, the merchant or the currency broker may lose money due to currency risk.

The predictive model 318 may use additional received inputs in the form of anticipated markups and charges for exchanging the payment currency into the preferred currency and other indications as to where the market exchange rate will be at time of actual settlement of the financial transaction. These inputs are used to determine an exchange rate that accounts for an acceptable amount of risk. Inputs may include a hedging fee, a supplier's broker fee, an intermediary's markup, and/or other fees or charges. Intermediary markups are markups from any party in the payment chain.

By way of example, consider a merchant converting Mexican pesos to U.S. dollars, making use of a credit card company as a payment. The example uses the following example parameters:

US Dollar to Mexican Peso Market Exchange Rate: 10.00 to 1

Currency Broker Financial Institution Exchange Rate: 11.8500

Merchant Markup: 3.0%

Here, the currency broker financial institution exchange rate is the supplier broker rate (including a fee) and the merchant markup is an intermediary markup, which may in part cover any risk associated with the exchange of the currency. Other examples of intermediary markups are credit card company markups and credit card acquirer/payment processor markups, usually in the form of a percentage.

In the above example, an all inclusive customer currency exchange rate might then be 12.2055 (i.e. 11.85 plus 3%).

Note that the 12.2055 rate is merely an estimate from the predictive model. Accordingly, the exchange rate might result in a loss for the merchant or a gain for the merchant. The predictive model may be further modified to take into account risk sharing between the merchant and a currency broker financial institution as follows.

Profit Scenario—Estimated exchange rate is greater than market rate at time of actual settlement. Consider a customer who buys $100 of goods in Mexican pesos at 12.2055. The merchant then commits to debiting 1220.55 pesos from the customer. Three days later, the merchant settles with a currency broker financial institution and at the market rates at the time of settlement receives $101.71. As a result, the merchant has realized $1.71 in currency exchange profit. Under some risk allocation schemes, the merchant may agree to pay some portion of the currency exchange profit of $1.71 to the currency broker financial institution.

Loss Scenario—Estimated exchange rate is less than market rate at time of actual settlement. Consider the same scenario as above except at time of actual settlement, the merchant receives $98.50. Here the merchant has lost $1.50. Under some risk allocation schemes, the merchant may have an agreement for the currency broker financial institution to compensate for all or some of the loss of $1.50.

For large numbers of transactions, the predictive model 318 may thus be modified such that such risk allocation schemes to split profits and losses between the merchant and a currency broker financial institution are taken into account. The net result is a lowering of currency volatility from the perspective of the customer.

The above example discusses models where estimated exchange rates resulting in a profit may be offset with estimated exchange rates resulting in a loss. However other offsetting schemes may be utilized. For example, models may be developed in which one currency is offset against another.

Yet other models may utilize three or more currencies further reducing volatility. Specifically, consider a currency preferred by a merchant and a non-settlement currency to be used by the customer. If there was a third currency with less volatility than the preferred currency, it may be desirable to offset the volatility of the preferred currency and/or the non-settlement currency with the third currency. This may be accomplished by modifying the estimated exchange rate to take into account the offset with the third currency.

Exemplary Non-Settlement Currency Exchange Process

Figure 4:
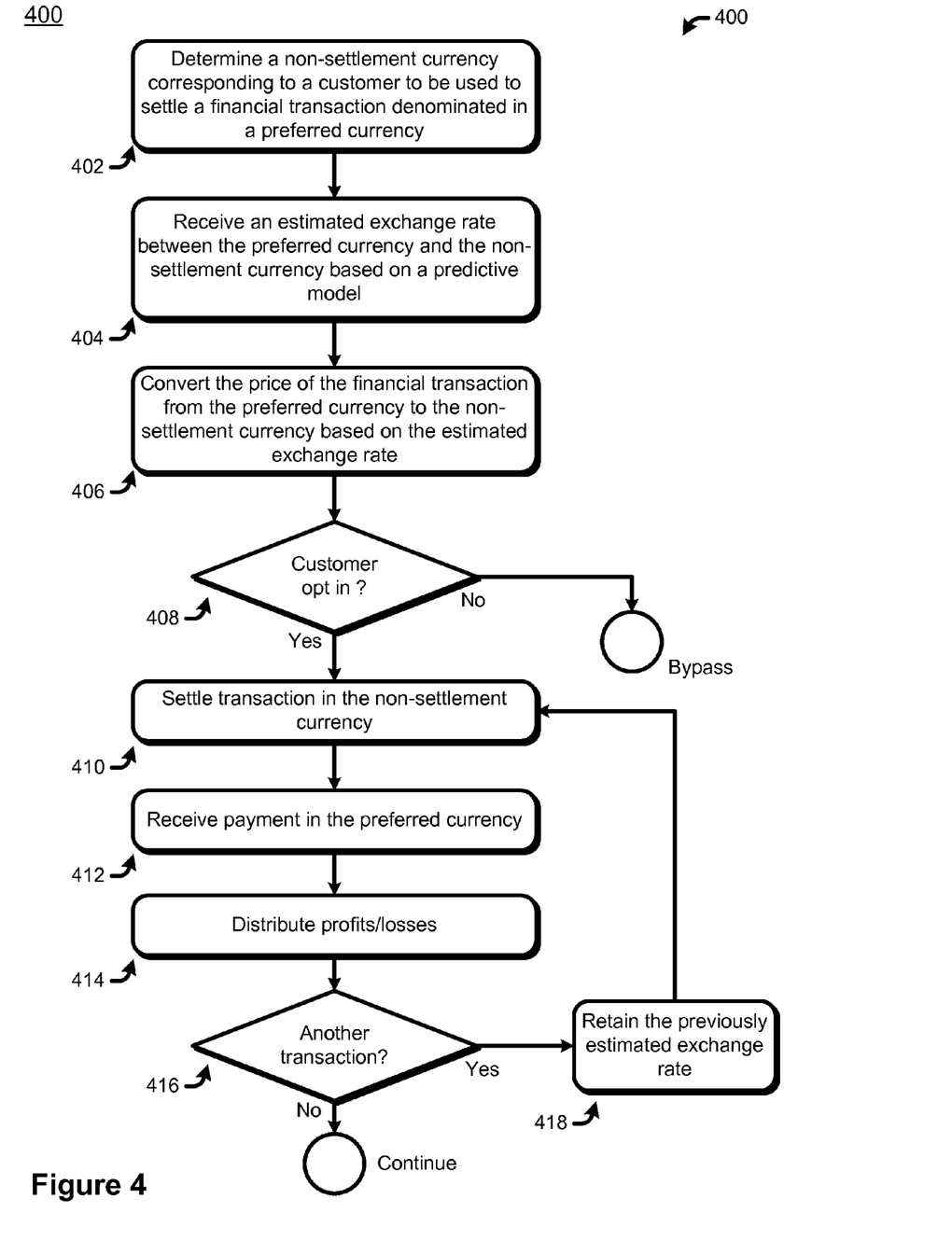
FIG. 4 is a flow diagram of an example process of settling financial transactions in a non-settlement currency.

FIG. 4 is a flow chart illustrating an illustrative non-settlement currency exchange process 400. Specifically, FIG. 4 illustrates the customer experience of the non-settlement currency exchange process. In order to effect borderless transactions, it is desirable not only for the customer to have a particular exchange rate for a single transaction, but also for related subsequent transactions such as refunds, chargebacks and representments. In the following example, a customer is performing financial transactions via an electronic marketplace. However, the customer could alternatively be performing financial transactions from payment schemes such as on-site point of sale systems.

The process 400 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

In block 402, an electronic marketplace may determine a currency with which a customer is to pay. The determined currency may be referred to as a payment currency or a non-settlement currency. For example, a customer may wish to buy a widget priced in U.S. dollars with Mexican pesos. The electronic marketplace may determine the customer's currency automatically such as making use of Internet Protocol (IP) address geolocation, by profiling, by asking the customer and so forth. Alternatively, the electronic marketplace may determine the customer's currency by receiving an indication or selection from the customer during a payment process.

In block 404, upon receiving the payment currency, which is the non-settlement currency, the web site may request and receive an estimated exchange rate from a non-settlement currency exchange using a predictive model. This estimated exchange rate is then used to present an offer of payment in the non-settlement currency to the customer. As discussed above, the estimated exchange rate may be based at least in part on a current exchange rate, a prediction of a future exchange rate based on history of the exchange rate, fees, allocation of risk, and/or other possible factors.

In block 406, the process 400 may convert the price of the financial transaction from the preferred currency (e.g., U.S. Dollars in this example) to the non-settlement currency (e.g., Mexican Pesos in this example) based on the estimated exchange rate.

In block 408, the customer can either choose or reject the price that uses the estimated exchange rate. Recall that the estimated exchange rate is merely an estimate and reflects risk. If the exchange rate is too disadvantageous, the customer may simply opt out. In the event the customer rejects the price using the estimated exchange rate, the customer bypasses the rest of the non-settlement payment logic. If the customer bypasses, the customer could pay in another currency, be diverted to another currency exchange scheme, or take other appropriate actions.

When the customer opts-in at the block 408, processing continues via the "yes" route. The customer's currency has been determined and the customer has opted into paying using the price based on estimated exchange rate (e.g., Mexican Pesos in this example).

In block 410, at the time of settlement, the customer may pay for the items (and/or services) in the non-settlement currency (e.g., Mexican Pesos in this example) for the price that includes the estimated exchange rate. In block 412, the merchant may receive payment in the preferred currency (e.g., US Dollars in this example) as discussed in the description of FIG. 1, via the non-settlement currency exchange 120.

The received payment in the preferred currency (e.g., US dollars) may result in a profit or loss depending on the accuracy of the estimated exchange rate when the non-settlement currency is actually exchanged (sometimes days to weeks after the interaction with the customer) and the true exchange rate is determined.

In block 414, profits and losses may be distributed between entities. In accordance with various embodiments, a portion of the profits may be distributed between entities (e.g., merchant, financial institution) or retained by a single party. Similarly, a portion of the losses may be distributed between entities or charged to a single party.

After settlement, the customer may seek to perform another related transaction. Specifically, in block 416, a customer may seek to refund, or otherwise undo the original purchase. Alternatively, the customer may seek to perform a chargebacks or representments. In some of these cases, as shown in block 418, the same estimated exchange rate as originally estimated at block 404 may be retained and possibly used again in a subsequent and related transaction, such as a return of the purchased goods/services, a chargeback, or a representment. For example, when the return or other related transaction is preformed within a threshold amount of time, the estimated exchange rate may be used again. In this way, the customer may be shielded from currency exchange volatility for subsequent related transactions. Thus, in some instances, a return may be processed starting at the block 410 rather than re-estimating the exchange rate at 404.

Figure 5:
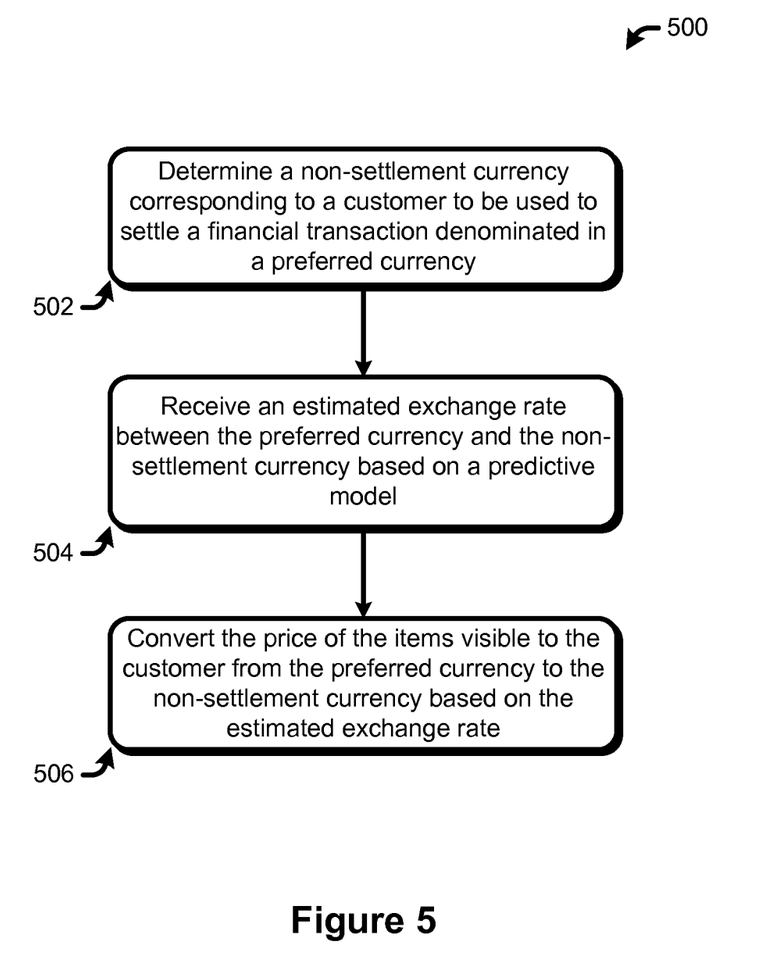
FIG. 5 is a flow diagram of an example process of displaying prices of items in a non-settlement currency.

FIG. 5 is a flowchart of an example process of displaying prices of items in a non-settlement currency. Blocks 502 and 504 may be performed substantially similarly to the blocks 402 and 404. For example, in block 502, the merchant may determine a location of the customer, such as by analyzing the customer's IP address of a data connection with a client device to determine that the customer is located in a country that transacts in a non-settlement currency. Alternatively, the customer may specify his or her preference to use the non-settlement currency.

In block 506, the merchant may present prices to the customer in the non-settlement currency, and possibly also in the preferred currency (merchant's default currency). By providing prices in the non-settlement currency, the merchant may shield the customer from the impression that the electronic marketplace is cross-border. Later during the customer/merchant interaction, the customer may decide to opt-in and settle the transaction using the non-settlement currency as discussed in the process 400 shown in FIG. 4.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system to process financial transactions, the system comprising:
   at least one computing device configured to implement one or more services, wherein the one or more services are configured to:
      receive transaction data pertaining to a plurality of non-settlement currency transactions involving a merchant that settles the plurality of non-settlement currency transactions in a preferred currency;
      for a non-settlement currency transaction of the plurality of non-settlement currency transactions:
         determine a payment currency to be used to satisfy the non-settlement currency transaction, the payment currency being a non-settlement currency that is different than the preferred currency;
         receive inputs relating to indications of what value a market exchange rate will be set at during a time of actual settlement of the non-settlement currency transaction, wherein the time of actual settlement of the non-settlement currency transaction is based at least in part on a predetermined time after a time of the non-settlement currency transaction;
         estimate, via a predictive model incorporating at least some of the inputs, a predicted exchange rate for exchanging the preferred currency into the payment currency, wherein the predicted exchange rate is based at least in part on the indications of what value the market exchange rate will be at during the time of actual settlement of the non-settlement currency transaction;
         convert a price of the non-settlement currency transaction from the preferred currency to the payment currency based at least in part on the predicted exchange rate; and
         receive a payment selection to settle the non-settlement currency transaction in the payment currency, wherein a profit or a loss for the non-settlement currency transaction is included in the transaction data to account for the market exchange rate at the time of actual settlement being different from the predicted exchange rate;
      distribute, between a plurality of entities including the merchant and at least one additional entity, at least a portion of net profits or net losses resulting from the plurality of non-settlement currency transactions, the net profits or the net losses calculated based at least in part on the transaction data that includes the profit or the loss for the non-settlement currency transaction; and
      modify the predictive model based at least in part on the transaction data.

2. The system of claim 1, wherein the one or more services are further configured to:
   determine that the predicted exchange rate is greater or lesser than the market exchange rate at the time of actual settlement of the non-settlement currency transaction.

3. The system of claim 1, wherein the one or more services are further configured to:
   monitor the predictive model; and
   store operations by the predictive model in a data store by predicting the predicted exchange rate of the payment currency into the preferred currency via the predictive model,
   wherein modifying the predictive model comprises dynamically modifying the predictive model in real-time.

4. A method comprising:
   receiving transaction data pertaining to a plurality of non-settlement currency transactions involving a merchant that settles the plurality of non-settlement currency transactions in a preferred currency;
   for a non-settlement currency transaction of the plurality of non-settlement currency transactions:
      determining a payment currency to be used to satisfy the non-settlement currency transaction, the payment currency being a non-settlement currency that is different than the preferred currency;
      receiving inputs relating to indications of what value a market exchange rate will be set at during a time of actual settlement of the non-settlement currency transaction, wherein the time of actual settlement of the non-settlement currency transaction is based at least in part on a predetermined time after a time of the non-settlement currency transaction;
      determining, via one or more computing devices that execute a predictive model incorporating at least some of the inputs, a predicted exchange rate for exchanging the preferred currency into the payment currency, wherein the predicted exchange rate is based at least in part on the indications of what value the market exchange rate will be set at during the time of actual settlement of the non-settlement currency transaction;

converting a price of the non-settlement currency transaction from the preferred currency to the payment currency based at least in part on the predicted exchange rate; and receiving a payment selection to settle the non-settlement currency transaction in the payment currency, wherein a profit or a loss for the non-settlement currency transaction is included in the transaction data if the market exchange rate at the time of actual settlement is different from the predicted exchange rate;

distributing, between a plurality of entities including the merchant and at least one additional entity, at least a portion of net profits or net losses resulting from the plurality of non-settlement currency transactions, the net profits or the net losses calculated based at least in part on the transaction data that includes the profit or the loss for the non-settlement currency transaction; and modifying the predictive model based at least in part on the transaction data.

5. The method of claim 4, wherein the determining of the payment currency comprises determining, based at least in part on connection data associated with a location of a computing device, the payment currency.

6. The method of claim 4, wherein the determining of the payment currency comprises receiving, from a computing device, a selection of the payment currency from one or more currency selections.

7. The method of claim 4, wherein the predictive model further predicts the predicted exchange rate by receiving additional inputs, the additional inputs including at least one of:
a hedging fee;
a supplier's broker fee; or
an intermediary's markup.

8. The method of claim 4, further comprising:
determining whether the predicted exchange rate is greater or lesser than the market exchange rate at the time of actual settlement of the non-settlement currency transaction.

9. The method of claim 4, wherein the payment currency is further determined by a third party merchant, and the method further comprising transmitting, to the third party merchant, the predicted exchange rate.

10. A system to process financial transactions, the system comprising:
at least one computing device configured to implement one or more services, wherein the one or more services are configured to:
receive transaction data pertaining to a plurality of non-settlement currency transactions involving a merchant that settles the plurality of non-settlement currency transactions in a preferred currency;
for a non-settlement currency transaction of the plurality of non-settlement currency transactions:
determine a payment currency to be used to satisfy the non-settlement currency transaction, the payment currency being a non-settlement currency that is different from the preferred currency;
receive a predicted exchange rate for exchanging the preferred currency into the payment currency based at least in part on a predictive model, wherein the predicted exchange rate is based at least in part on indications of what value a market exchange rate will be set at during a time of actual settlement of the non-settlement currency transaction, and wherein the time of settlement of the non-settlement currency transaction is based at least in part on a predetermined time after a time of the non-settlement currency transaction;

convert a price of the non-settlement currency transaction from the preferred currency to the payment currency based at least in part on the predicted exchange rate; and receive a payment selection to settle the non-settlement currency transaction in the payment currency, wherein a profit or a loss for the non-settlement currency transaction is included in the transaction data if the market exchange rate at the time of actual settlement is different from the predicted exchange rate; and distribute, between a plurality of entities including the merchant and at least one additional entity, at least a portion of net profits or net losses resulting from the plurality of non-settlement currency transactions, the net profits or the net losses calculated based at least in part on the transaction data that includes the profit or the loss for the non-settlement currency transaction.

11. The system of claim 10, wherein the one or more services are further configured to receive a payment from a financial institution in the preferred currency after conversion of the payment currency.

12. The system of claim 11, wherein the one or more services are further configured to receive a subsequent non-settlement currency transaction after a settlement of the non-settlement currency transaction, wherein the subsequent non-settlement currency transaction includes at least one of:
a second non-settlement currency transaction;
a refund of non-settlement currency transaction;
a chargeback; or
a representment; and
wherein the subsequent non-settlement currency transaction is guaranteed to be settled using the predicted exchange rate when a time between the subsequent non-settlement currency transaction and the non-settlement currency transaction is less than a threshold amount of time.

13. The system of claim 10, wherein the one or more services are further configured to present prices of items for purchase in the payment currency based at least in part on the predicted exchange rate.

14. A non-settlement currency exchange system to interact with a merchant to enable the merchant to facilitate transactions involving currency exchange rates for non-settlement currencies, the system comprising:
a hardware processor; and
a currency exchange module operative on the hardware processor;
a predictive model operative on the hardware processor to determine predicted exchange rates for non-settlement currency transactions for the currency exchange module, wherein the predictive model is configured to determine the predicted exchange rates based at least in part on indications of what value a market exchange rate will be set at during a time of actual settlement of non-settlement currency transactions, wherein the time of actual settlement of the non-settlement currency transactions is based at least in part on a predetermined time after a time of the non-settlement currency transactions;

a rate interface module operative on the hardware processor to provide currency exchange rate data to the predictive model;

a non-settlement transaction interface module operative on the hardware processor to provide the non-settlement currency transactions to the currency exchange module and receive settlements in a preferred currency from the currency exchange module; and a financial institution interface module operative on the hardware processor to provide non-settlement currency requested from the currency exchange module, wherein the non-settlement currency exchange system distributes, between a plurality of entities including a merchant and at least one additional entity, at least a portion of net profits or net losses resulting from a plurality of non-settlement currency transactions that are settled by the merchant, the net profits or the net losses calculated based at least in part on transaction data that includes a profit or a loss for individual non-settlement currency transactions of the plurality of non-settlement currency transactions.

15. The system of claim 14, wherein the system further comprises:

a monitor operative on the hardware processor to monitor actions of the currency exchange module, to determine inputs used by the predictive model in determining the predicted exchange rates, and to store monitored data; and an administrative interface module operative on the hardware processor to access the monitored data.

16. The system of claim 15, wherein the monitored data accessed via the administrative interface module includes at least one of:

a volatility of a particular non-settlement currency;
a volatility of the preferred currency;
a spread between the preferred currency and the non-settlement currency;
a cost of a fee to process an exchange between the preferred currency and the non-settlement currency; and an adoption rate of new customers traceable to enabling processing and the non-settlement currency.

17. The system of claim 15, the system further comprising:

a data store coupled to the monitor to store the monitored data, the monitored data including currency exchange data; and an auxiliary data interface to access the monitored data stored in the data store, via which the administrative interface may retrieve currency exchange data sets.

18. The system of claim 17, wherein the retrieved currency exchange data sets are of currency exchanges with currency exchange rates exceeding a predetermined threshold; and wherein the auxiliary data interface is operatively coupled with the administrative interface to terminate currency exchange rates exceeding the predetermined threshold.

19. The system of claim 15, where the predictive model is configured to be modified via the administrative interface module.

20. The system of claim 14, wherein the predictive model is dynamically modified in real-time.

21. The system of claim 14, wherein the predictive model is modified to change a markup of a spread between the preferred currency and the non-settlement currency.

22. The system of claim 14, wherein determining the predicted exchange rates is further based on fees earned from processing the non-settlement currency transactions while ensuring that a customer base supported by the non-settlement currency transactions does not fall below a predetermined threshold.

23. The system of claim 10, wherein the one or more services are further configured to:

cause the price to be presented to a customer; and
in response to receiving a payment selection to settle in the payment currency, cause the non-settlement currency transaction to be settled in the payment currency.

* * * * *